(12) United States Patent
Lee et al.

(10) Patent No.: US 10,686,201 B2
(45) Date of Patent: Jun. 16, 2020

(54) METHOD AND SYSTEM FOR SETTING CUTTING TIME OF GASKET DURING MANUFACTURE OF MEA

(71) Applicants: HYUNDAI MOTOR COMPANY, Seoul (KR); KIA MOTORS CORPORATION, Seoul (KR)

(72) Inventors: Sun Ho Lee, Seoul (KR); Sunha Hwang, Uijeongbu-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 230 days.

(21) Appl. No.: 15/825,367

(22) Filed: Nov. 29, 2017

(65) Prior Publication Data

US 2018/0166709 A1 Jun. 14, 2018

(30) Foreign Application Priority Data

Dec. 14, 2016 (KR) .................. 10-2016-0170794

(51) Int. Cl.
| | |
|---|---|
| H01M 8/0286 | (2016.01) |
| B26D 5/20 | (2006.01) |
| H01M 8/1004 | (2016.01) |
| B26D 5/00 | (2006.01) |
| B26D 5/34 | (2006.01) |
| H01M 4/88 | (2006.01) |
| H01M 8/124 | (2016.01) |

(52) U.S. Cl.
CPC .......... *H01M 8/0286* (2013.01); *B26D 5/007* (2013.01); *B26D 5/20* (2013.01); *B26D 5/34* (2013.01); *H01M 4/88* (2013.01); *H01M 8/1004* (2013.01); *H01M 8/124* (2013.01); *Y02P 70/56* (2015.11)

(58) Field of Classification Search
CPC ....... H01M 8/02; H01M 8/0271–0286; H01M 8/10–1097; B26D 5/00; B26D 5/20–36; B26F 1/00–14; B26F 1/38–46
See application file for complete search history.

(56) References Cited

U.S. PATENT DOCUMENTS

| | | | | |
|---|---|---|---|---|
| 4,384,500 | A * | 5/1983 | Friberg | ............... B26D 5/34 700/167 |
| 2001/0007217 | A1* | 7/2001 | Wagner | ............. B23D 25/02 83/37 |

(Continued)

*Primary Examiner* — Jonathan G Leong
*Assistant Examiner* — Jacob Buchanan
(74) *Attorney, Agent, or Firm* — Brinks Gilson & Lione

(57) ABSTRACT

A method of setting a cutting time of a gasket during manufacture of a membrane electrode assembly (MEA) is provided. The method includes: moving a reaction sheet, in which electrode layers are formed on an electrolyte membrane with a predetermined interval; photographing a boundary area between the electrolyte membrane and the electrode layer in the moving reaction sheet by using a fixed vision; setting a front end reference line and a rear end reference line between a front-most end and a rear-most end in the boundary area; calculating a trigger reference line between the front end reference line and the rear end reference line, except for a front portion of the front end reference line and a rear portion of the rear end reference line; and calculating a cutting time of a gasket based on the trigger reference line.

7 Claims, 9 Drawing Sheets

(56) References Cited

U.S. PATENT DOCUMENTS

2003/0221311 A1\* 12/2003 Smith ................. H01M 4/8605
29/623.2
2004/0241525 A1\* 12/2004 Mekala ............... H01M 8/1039
156/263
2008/0145712 A1\* 6/2008 Pierpont ............... B32B 37/203
429/509

\* cited by examiner

FIG. 8

Cutter operation time = $f$ (Trigger reference line, Speed, Distance, Offset value)

Calculated value ← 
Detected value ← Set value
Selected value ←

METHOD AND SYSTEM FOR SETTING CUTTING TIME OF GASKET DURING MANUFACTURE OF MEA

CROSS-REFERENCE TO RELATED APPLICATION

This application claims priority to and the benefit of Korean Patent Application No. 10-2016-0170794, filed Dec. 14, 2016, the entire contents of which are incorporated herein by reference.

FIELD

The present disclosure relates to a method and a system for setting a cutting time of a gasket during manufacture of a membrane electrode assembly (MEA).

BACKGROUND

The statements in this section merely provide background information related to the present disclosure and may not constitute prior art.

As is known, a fuel cell generates electricity by an electrochemical reaction between hydrogen and oxygen. The fuel cell may receive a chemical reactant from the outside and continuously generate electricity even without a separate charging process.

The fuel cell may be formed by disposing separators (separating plates) at both sides of a membrane electrode assembly (MEA) with the MEA interposed therebetween. A plurality of sheets of the fuel cell may be continuously arranged to be formed as a fuel cell stack.

The MEA that is a core component of the fuel cell forms a hydrogen electrode and an air electrode at both sides based on an electrolyte membrane, through which hydrogen ions move, as electrode layers. Further, the MEA includes a sub gasket which protects the electrode layer and the electrolyte membrane and secures assembling of the fuel cell.

In a process of manufacturing the MEA, an electrode sheet is manufactured by a decal method, in which an electrolyte membrane wound in a roll type is unwound, and electrode layers are continuously transferred to both surfaces of the electrolyte membrane while being spaced apart from both surfaces of the electrolyte membrane by a predetermined interval (about 150 mm pitch).

Then, a MEA sheet is manufactured by a roll-to-roll method, in which the electrode sheet wound in the roll type is unwound and transferred, sub gaskets in the roll type are unwound and are positioned on both surfaces of the electrode sheet, and the sub gaskets are bonded to both surfaces of the electrode sheet while making the sub gaskets pass through a hot roller, as a post process.

Further, a fuel cell is manufactured by bonding the MEA and a gas diffusion layer (GDL) to each other at a high temperature and alternately laminating the bonded structure with the separating plate.

In the meantime, during the process of bonding the gasket to a boundary area of the electrode layer and the electrolyte membrane in the state where the electrode layer is formed on the electrolyte membrane, the electrolyte membrane may be exposed in a reaction area, and general performance of the fuel cell may be degraded.

The above information disclosed in this Background section is only for enhancement of understanding of the background of the present disclosure and therefore it may contain information that does not form the prior art that is already known to a person of ordinary skill in the art.

SUMMARY

The present disclosure provides a method and a system for setting a cutting time of a gasket during manufacture of a membrane electrode assembly (MEA), in which an electrode layer is formed on an electrolyte membrane, a gasket is attached to an accurate position of a boundary area of the electrode layer and the electrolyte membrane, thereby inhibiting the electrolyte membrane from being exposed in a reaction surface of the electrode layer and improving general performance of a fuel cell. An exemplary form of the present disclosure provides a method of setting a cutting time of a gasket during manufacture of a membrane electrode assembly (MEA), the method including: moving a reaction sheet, in which electrode layers are formed on an electrolyte membrane with a predetermined interval, in a predetermined direction; photographing a boundary area between the electrolyte membrane and the electrode layer in the moving reaction sheet by using a fixed vision; setting a front end reference line and a rear end reference line between a front-most end and a rear-most end in a form of the electrode layer in the boundary area; calculating a trigger reference line between the front end reference line and the rear end reference line, except for a front portion of the front end reference line and a rear portion of the rear end reference line; and calculating a cutting time of a gasket, which is to be attached to the boundary area between the electrolyte membrane and the electrode layer, based on the trigger reference line.

The front end reference line and the rear end reference line may be preset points between the front-most end and the rear-most end.

The trigger reference line may be calculated by averaging values of areas of the electrode layers between the front end reference line and the rear end reference line.

The method may further include: detecting a first movement speed of the reaction sheet: calculating or selecting a first movement distance from the trigger reference line to a pressing reference line, in which the gasket is compressed to the reaction sheet; calculating a first arrival time, at which the trigger reference line reaches the pressing reference line based on the first movement distance and the first movement speed; and calculating a cutting time, at which the cutter cuts the gasket, based on the first arrival time.

The method may further include: detecting a second movement speed of the gasket moving from the cutter to the pressing reference line; calculating or selecting a second movement distance of the gasket from the cutter to the pressing reference line; and calculating a second arrival time, at which the gasket reaches from the cutter to the pressing reference line based on the second movement distance and the second movement speed, in which the cutting time, at which the cutter cuts the gasket, may be calculated based on the first arrival time and the second arrival time.

The method may further include correcting the cutting time so as to be increased or decreased by an offset value based on tension of the reaction sheet and the gasket or an operation condition.

Another exemplary form of the present disclosure provides a system for setting a cutting time of a gasket during manufacture of a membrane electrode assembly (MEA). The system includes: a main supply roller configure to continuously supply a reaction sheet, in which electrode layers are arranged on an electrolyte membrane with a predetermined interval; the main return roller disposed with a predetermined distance from the supply roller and configured to roll and return the reaction sheet unwound from the supply roller; a gasket supply roller, which is disposed while having a predetermined distance from a movement line of the reaction sheet, and around which the gasket is wound; a gasket cutter configured to cut a predetermined position of the gasket, which is unwound from the gasket supply roller and moves, to have a predetermined form; a gasket pressing roller configured to press the gasket to the reaction sheet so that the gasket cut by the gasket cutter is attached to the reaction sheet supplied from the main supply roller; a vision disposed between the main supply roller and the gasket pressing roller and configured to photograph a boundary area between the electrolyte membrane and the electrode layer in the reaction sheet; and a controller. The controller is configured to set a front end reference line and a rear end reference line between a front-most end and a rear-most end in a form of the electrode layer in the boundary area photographed by the vision, calculate a trigger reference line between the front end reference line and the rear end reference line, except for a front portion of the front end reference line and a rear portion of the rear end reference line, and calculate a cutting time for cutting the gasket, which is to be attached to the boundary area between the electrolyte membrane and the electrode layer, based on the trigger reference line.

The front end reference line and the rear end reference line may be preset points between the front-most end and the rear-most end.

The trigger reference line may be calculated by averaging values of areas of the electrode layers between the front end reference line and the rear end reference line.

The controller may detect a first movement speed of the reaction sheet, calculate or select a first movement distance from the trigger reference line to a pressing reference line, in which the gasket is compressed to the reaction sheet, calculate a first arrival time, at which the trigger reference line reaches the pressing reference line based on the first movement distance and the first movement speed, and calculate a cutting time for cutting the gasket based on the first arrival time.

The controller may detect a second movement speed of the gasket moving from the cutter to the pressing reference line, calculate or select a second movement distance of the gasket from the cutter to the pressing reference line, calculate a second arrival time, at which the gasket reaches from the cutter to the pressing reference line based on the second movement distance and the second movement speed, and calculate the cutting time, at which the cutter cuts the gasket, based on the first arrival time and the second arrival time.

The cutting time may be corrected so as to be increased or decreased by an offset value based on tension of the reaction sheet and the gasket or an operation condition.

The system may further include a hot roller, which is disposed between the gasket pressing roller and the main return roller, and presses the gasket to the reaction sheet at a predetermined temperature or higher.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 8 is a formula representing factors for setting a cutter operation time.

Figure 1:
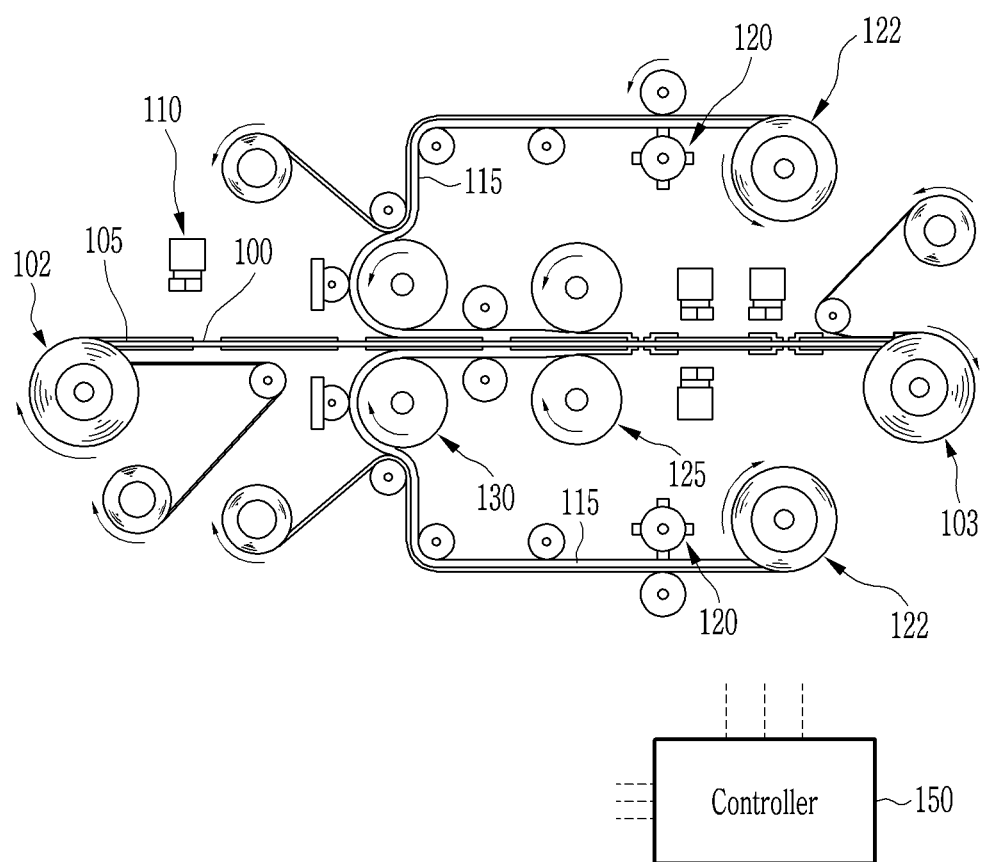
FIG. 1 is a schematic diagram of an MEA manufacturing system, which cuts a gasket.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, an exemplary form of the present disclosure will be described in detail with reference to the accompanying drawings.

FIG. 1 is a schematic diagram of an MEA manufacturing system, which cuts a gasket, according to an exemplary form of the present disclosure.

Referring to FIG. 1, the MEA manufacturing system includes a main supply roller 102, a main return roller 103, an electrolyte membrane 100, an electrode layer 105, a vision 110, a gasket 115, a gasket cutter 120, a gasket supply roller 122, a gasket pressing roller 130, a hot roller 125, and a controller 150.

In the exemplary form of the present disclosure, the electrode layers 105 are formed on the electrolyte membrane 100 with a predetermined interval, and for convenience of the description, the electrolyte membrane 100 and the electrode layer 105 may be called as one reaction sheet.

The reaction sheet is wound around the main supply roller 102, and the reaction sheet sequentially passes the gasket pressing roller 130 and the hot roller 125, and is wound around the main return roller 103 again. The gasket cut by the gasket pressing roller is attached, and the hot roller 125 presses the attached gasket at a set temperature again.

In the exemplary form of the present disclosure, the gasket 115 is attached onto a protection sheet, and the gasket 115 and the protection sheet are rolled around the gasket supply roller 122. Further, the gasket supply roller 122 continuously supplies the gasket and the protection sheet.

The gasket cutter 120 is disposed so as to cut the gasket on the protection sheet in a form of a quadrangular window corresponding to the electrode layer, and the cut gasket 115 is pressed and attached to the reaction sheet in the state of being attached to a pressing surface of the gasket pressing roller 130.

The hot roller 125 presses the gasket 115, the electrolyte membrane 100, and the electrode layer 105 at a set temperature, and the completed MEA is wound around the main return roller 103.

The gasket 115 cut by the gasket cutter 120 moves in the state of being attached to the protection film, and the cut gasket 115 is attached to an outer peripheral surface of the gasket pressing roller 130 and the protection film is returned by a return roller.

The controller 150 detects positions of the electrolyte membrane 100 and the electrode layer 105 through the vision 110, operates the gasket cutter 120, and cuts the gasket 115.

In the exemplary form of the present disclosure, the controller 150 may be implemented by one or more microprocessors operated by a predetermined program, and the predetermined program may include a series of commands for performing a method according to an exemplary form of the present disclosure to be described below.

Figure 2:
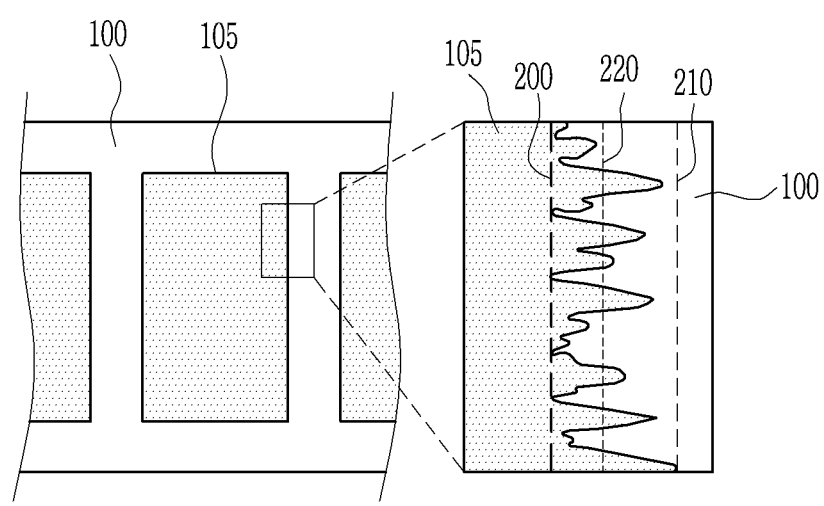
FIG. 2 is a detailed top plan view of a part of an electrolyte membrane and an electrode layer.

FIG. 2 is a detailed top plan view of a part of the electrolyte membrane and the electrode layer according to the exemplary form of the present disclosure.

Referring to FIG. 2, the vision 110 photographs a boundary area between the electrolyte membrane 100 and the electrode layer 105, and a portion, at which the electrode layer 105 is cut, has a structure of a crest and root, and a front-most end line 210 is formed in response to a crest, and a rear-most end line 200 is formed in response to a root.

A vision center line 220 corresponding to the vision 110 is formed between the front-most end line 210 and the rear-most end line 200.

When the vision 110 detects the front-most end line 210, a position of the electrode layer 105 is set to a front side, so that the gasket cutter 120 earlier performs cutting than a predetermined time, the gasket 115 cannot completely cover a boundary of the electrode layer 105, and the electrode layer 105 is exposed in the reaction surface at an inner side of the gasket 115, thereby degrading general performance.

Figure 3:
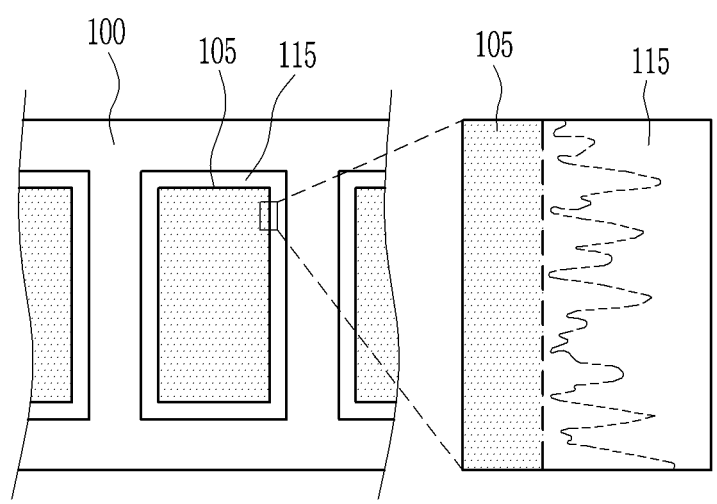
FIG. 3 is a partial detailed top plan view illustrating a state where a gasket is attached to the electrolyte membrane and the electrode layer.

FIG. 3 is a partial detailed top plan view illustrating a state where the gasket is attached to the electrolyte membrane and the electrode layer according to the exemplary form of the present disclosure.

Figure 6:
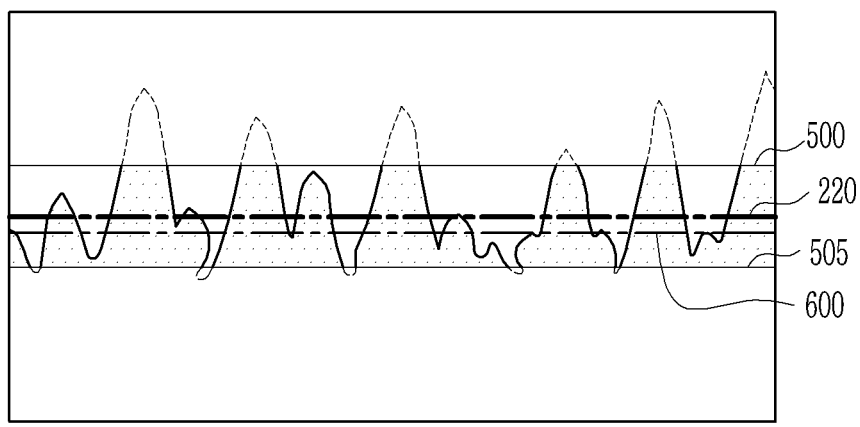
FIG. 6 is a partial detailed top plan view illustrating a trigger reference line in the boundary area of the electrolyte membrane and the electrode layer.

Referring to FIGS. 3 and 6, the vision 110 calculates a trigger reference line 600 set according to a form of a boundary of the electrode layer 105 between the front-most end line 210 and the rear-most end line 200, and the gasket cutter 120 is operated and cuts the gasket 115 at an appropriate time based on the trigger reference line 600.

Accordingly, the gasket 115 completely covers the boundary of the electrode layer 105, so that the electrode layer 105 is not exposed in the reaction surface of the gasket 115, thereby stably maintaining general performance.

Figure 4:
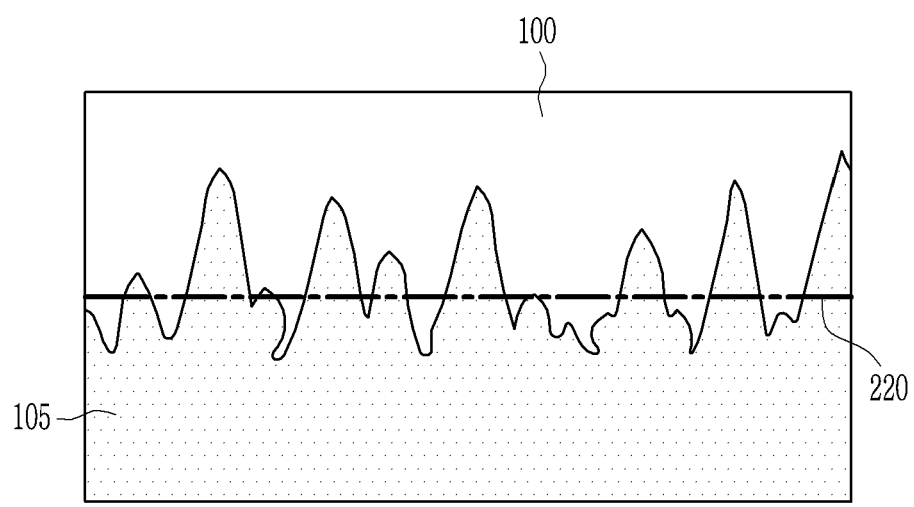
FIG. 4 is a partial detailed top plan view illustrating a photographed boundary area of the electrolyte membrane and the electrode layer.

FIG. 4 is a partial detailed top plan view illustrating a photographed boundary area of the electrolyte membrane and the electrode layer in one form of the present disclosure.

Referring to FIG. 4, the electrolyte membrane 100 and the electrode layer 105 are formed based on an image detected by the vision 110, and the vision center line 220 is formed at a center of the boundary area of the electrolyte membrane 100 and the electrode layer 105. The vision center line 220 may be set in advance for convenience of the description.

Figure 5:
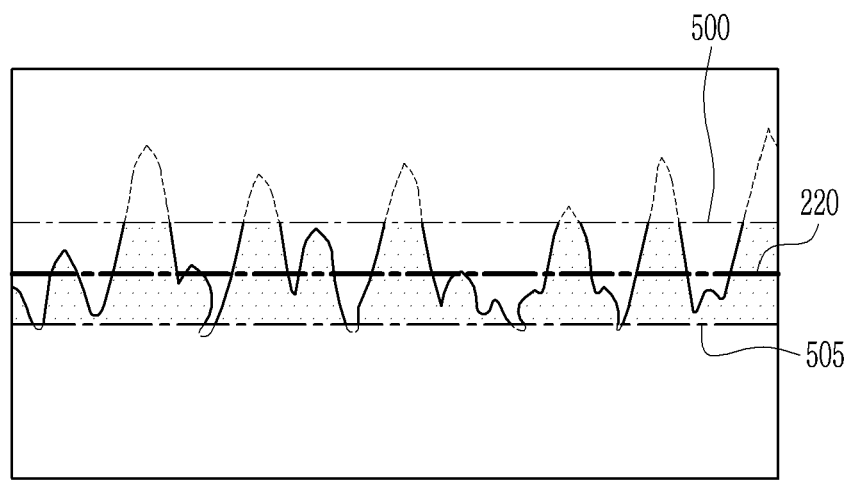
FIG. 5 is a partial detailed top plan view illustrating a front end reference line and a rear end reference line in the boundary area of the electrolyte membrane and the electrode layer.

FIG. 5 is a partial detailed top plan view illustrating a front end reference line and a rear end reference line in the boundary area of the electrolyte membrane and the electrode layer according to the exemplary form of the present disclosure.

Referring to FIG. 5, a front end reference line 500 and a rear end reference line 505 are set between the front-most end line 210 and the rear-most end line 200 by the controller 150. The front end reference line 500 and the rear end reference line 505 may be set by a predetermined ratio by the controller 150. Here, the vision center line 220 is positioned between the front end reference line 500 and the rear end reference line 505.

FIG. 6 is a partial detailed top plan view illustrating the trigger reference line in the boundary area of the electrolyte membrane and the electrode layer according to the exemplary form of the present disclosure.

Referring to FIG. 6, the controller 150 calculates areas of the electrode layers 105 between the front end reference line 500 and the rear end reference line 505, except for an external side of the front end reference line 500 and an external side of the rear end reference line 505, averages the areas of the electrode layers 105, and calculates the trigger reference line 600.

In one form of the present disclosure, the controller 150 calculates an operation time of the gasket cutter 120 based on the trigger reference line 600, so that the gasket 115 is attached to the boundary area of the electrode layer 105 and the electrolyte membrane 100 at a more accurate position, thereby effectively preventing the electrolyte membrane 100 from being exposed inside the reaction area.

Figure 7:
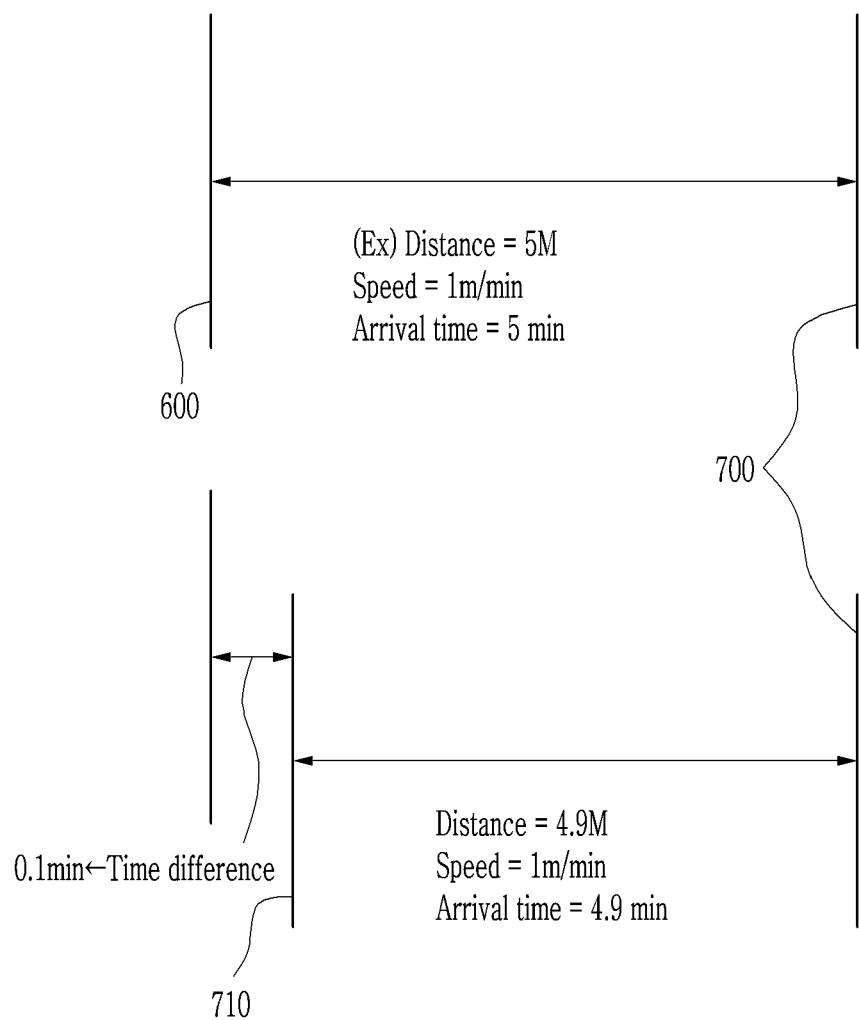
FIG. 7 is a table representing a relation between the trigger reference line, a pressing reference line, and a cutter reference line.

FIG. 7 is a table representing a relation between the trigger reference line, a pressing reference line, and a cutter reference line according to the exemplary form of the present disclosure.

Referring to FIG. 7, the trigger reference line and a pressing reference line 700 are formed. The pressing reference line 700 is a position, at which the gasket pressing roller 130 presses the gasket 115 and the reaction sheet, and may be set in advance.

Further, the trigger reference line 600 is calculated by the vision 110 and the controller 150 based on the contents described with reference to FIGS. 4, 5, and 6.

A first arrival time is calculated according to a distance between the trigger reference line 600 and the gasket pressing roller 130 and a movement speed of the reaction sheet.

Similarly, a second arrival time is calculated according to a distance between a cutting reference line 710, along which the gasket cutter 120 cuts the gasket 115, and the pressing reference line 700 and a movement speed of the gasket 115.

Accordingly, in one form of the present disclosure, the cutting reference line 710 is set after 0.1 minute based on the trigger reference line 600. That is, the gasket cutter 120 is operated after 0.1 minute based on the trigger reference line 600 and the gasket 115 is cut in a predetermined form, so that the gasket 115 may be attached onto the reaction sheet at an appropriate position.

FIG. 8 is a formula representing factors for setting a cutter operation time in one form of the present disclosure.

Referring to FIG. 8, the cutting reference time 710 of the gasket cutter 120 may be calculated by the trigger reference line 600, a movement speed of the reaction sheet and the gasket 115, a distance between the trigger reference line 600 and the pressing reference line 700, a distance between the gasket 115 and the pressing reference line 700, and a offset value.

In the exemplary form of the present disclosure, the movement speed may be detected by a speed detecting unit in real time, the trigger reference line 600 may be calculated by the controller 150, the distance is set in advance, and the offset value may be set according to tension of the reaction sheet and the gasket 115, a mechanical/electrical error, a design specification, an operation condition, and an external condition in advance or may be randomly corrected by an operator during an operation.

Figure 9:
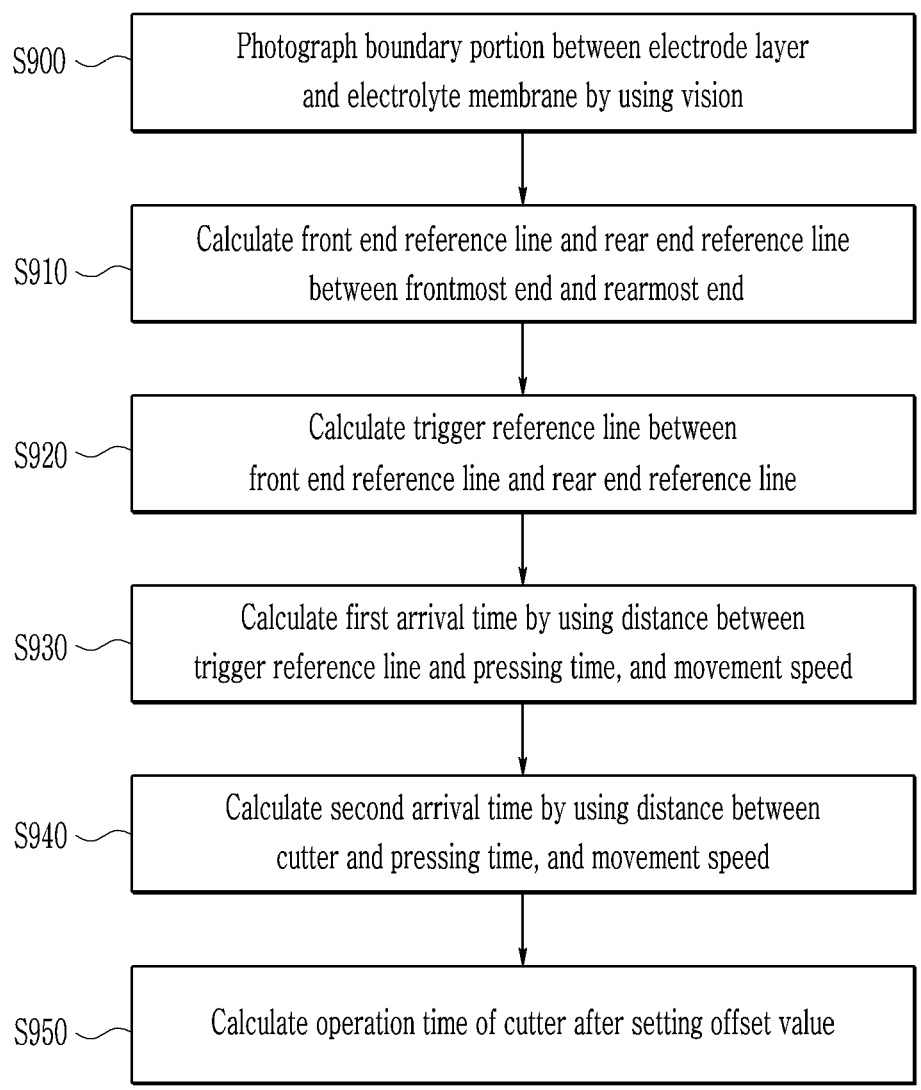
FIG. 9 is a flowchart illustrating a method of setting a cutting time of a gasket during manufacture of an MEA.

FIG. 9 is a flowchart illustrating a method of setting a cutting time of a gasket during manufacture of an MEA in one exemplary form of the present disclosure.

Referring to FIG. 9, the controller 150 photographs a boundary area between the electrolyte membrane 100 and the electrode layer 105 through the vision 110 in operation S900.

Next, in operation S910, the controller 150 calculates or selects a front end reference line 500 and a rear end reference line 505 between a frontmost end and a rear-most end of the electrode layers 105.

Next, in operation S920, the controller 150 calculates a trigger reference line 600 in an area between the front end reference line 500 and the rear end reference line 505, except for external sides of the front end reference line 500 and the rear end reference line 505. Here, the trigger reference line 600 may be calculated by averaging areas of the electrode layers 105.

Next, in operation S930, the controller 150 calculates a first arrival time by using a distance between the calculated trigger reference line 600 and a pressing time, and a movement speed of the reaction sheet, and in operation S940, the controller 150 calculates a second arrival time by using a distance between the gasket cutter 120 and a pressing reference line 700 and a movement speed of the gasket 115.

Then, the controller 150 calculates an operation time of the gasket cutter 120 by using the first and second arrival times and an offset value, and operates the gasket cutter 120.

As described above, a boundary portion between the electrolyte membrane and the electrode layer is photographed by using the vision, the trigger reference line for cutting the gasket is calculated, and the gasket is cut and supplied at a more accurate timing, so that it is possible to attach the gasket to a more accurate position.

Accordingly, it is possible to reduce or prevent the electrolyte membrane from being exposed in the reaction surface of the electrode layer, thereby improving general performance of a fuel cell.

That is, the vision calculates a trigger reference line set along a form of a boundary of the electrode, and the gasket cutter cuts the gasket at an appropriate time based on the trigger reference line.

Accordingly, the gasket completely covers the boundary of the electrode layer, so that the electrode layer is not exposed in the reaction surface inside the gasket, thereby stably maintaining general performance.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

What is claimed is:

1. A system for setting a cutting time of a gasket during manufacture of a membrane electrode assembly (MEA), the system comprising:
    a main supply roller configured to continuously supply a reaction sheet, in which electrode layers are arranged on an electrolyte membrane with a predetermined interval;
    a main return roller disposed with a predetermined distance from the supply roller, and configured to roll and return the reaction sheet unwound from the supply roller;
    a gasket supply roller disposed with a predetermined distance from a movement line of the reaction sheet, the gasket wound around the gasket supply roller;
    a gasket cutter configured to cut a predetermined position of the gasket, which is unwound from the gasket supply roller and moves, to have a predetermined form;
    a gasket pressing roller configured to press the gasket to the reaction sheet so that the gasket cut by the gasket cutter is attached to the reaction sheet supplied from the main supply roller;
    a vision disposed between the main supply roller and the gasket pressing roller and configured to photograph a boundary area between the electrolyte membrane and the electrode layers in the reaction sheet; and
    a controller configured to:
    set a front end reference line and a rear end reference line between a front-most end and a rear-most end in a form of the electrode layer in the boundary area photographed by the vision,
    calculate a trigger reference line between the front end reference line and the rear end reference line, except for a front portion of the front end reference line and a rear portion of the rear end reference line, and
    calculate a cutting time for cutting the gasket, which is to be attached to the boundary area between the electrolyte membrane and the electrode layer, based on the trigger reference line.

2. The system of claim 1, wherein:
    the front end reference line and the rear end reference line are preset points between the front-most end and the rear-most end.

3. The system of claim 2, wherein:
    the trigger reference line is calculated by averaging values of areas of the electrode layers between the front end reference line and the rear end reference line.

4. The system of claim 2, wherein:
    the controller is configured to:
    detect a first movement speed of the reaction sheet,
    calculate or select a first movement distance from the trigger reference line to a pressing reference line, in which the gasket is compressed to the reaction sheet,
    calculate a first arrival time, at which the trigger reference line reaches the pressing reference line based on the first movement distance and the first movement speed, and
    calculate a cutting time for cutting the gasket based on the first arrival time.

5. The system of claim 4, wherein:
    the controller is configured to:
    detect a second movement speed of the gasket moving from the cutter to the pressing reference line,
    calculate or select a second movement distance of the gasket from the cutter to the pressing reference line, calculate a second arrival time, at which the gasket reaches from the cutter to the pressing reference line based on the second movement distance and the second movement speed, and calculate the cutting time, at which the cutter cuts the gasket, based on the first arrival time and the second arrival time.

6. The system of claim 4, wherein:

the cutting time is corrected so as to be increased or decreased by an offset value based on tension of the reaction sheet and the gasket or an operation condition.

7. The system of claim 1, further comprising:

a hot roller disposed between the gasket pressing roller and the main return roller, and configured to press the gasket to the reaction sheet at a predetermined temperature or higher.

* * * * *